United States Patent [19]

Harnisch et al.

[11] Patent Number: 5,342,444
[45] Date of Patent: Aug. 30, 1994

[54] DYESTUFFS AND THEIR USE FOR MASS-COLORATION OF PLASTICS

[75] Inventors: Horst Harnisch, Much; Peter Roschger, Cologne, both of Fed. Rep. of Germany

[73] Assignee: Bayer Aktiengesellschaft, Leverkusen, Fed. Rep. of Germany

[21] Appl. No.: 919,657

[22] Filed: Jul. 24, 1992

[30] Foreign Application Priority Data

Aug. 8, 1991 [DE] Fed. Rep. of Germany ....... 4126244

[51] Int. Cl.$^5$ .................................................. C08K 5/23
[52] U.S. Cl. ............................... 106/493; 106/20 R; 106/22 R; 106/22 H; 8/401; 8/528; 548/365.7; 548/364.4
[58] Field of Search ............... 548/365.7, 364.4; 106/493, 20 R, 22 R, 22 H; 8/401, 528

[56] References Cited

U.S. PATENT DOCUMENTS

| | | | |
|---|---|---|---|
| 3,655,670 | 4/1972 | Spietschka et al. | 546/154 |
| 4,033,973 | 7/1977 | Schwander | 546/269 |
| 4,055,568 | 10/1977 | Patsch et al. | 548/136 |
| 4,260,776 | 4/1981 | Harnisch | 548/364.4 |
| 4,544,496 | 10/1985 | Claussen et al. | 252/301.35 |
| 4,764,622 | 8/1988 | Claussen et al. | 548/159 |

FOREIGN PATENT DOCUMENTS

| | | |
|---|---|---|
| 2122663 | 11/1972 | Fed. Rep. of Germany . |
| 0027529 | 9/1980 | Fed. Rep. of Germany . |
| 3609804 | 9/1987 | Fed. Rep. of Germany . |
| 1386846 | 3/1975 | United Kingdom . |

OTHER PUBLICATIONS

153665t: Plastics Manuf., vol. 81, 1974.

*Primary Examiner*—Karl Group
*Assistant Examiner*—Scott L. Hertzog
*Attorney, Agent, or Firm*—Sprung Horn Kramer & Woods

[57] ABSTRACT

Plastics are colored with at least one dyestuff of the following formula (I)

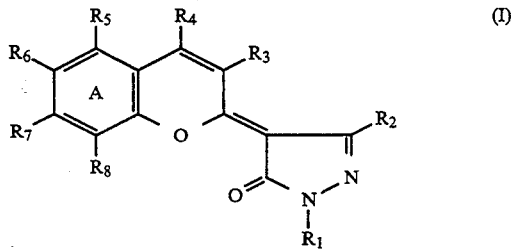

in which the substituents have the meaning given in the description.

11 Claims, No Drawings

DYESTUFFS AND THEIR USE FOR MASS-COLORATION OF PLASTICS

The present invention relates to a process for the masscoloration of plastics and to new dyestuffs.

The mass-coloration of plastics, for example of thermoplastics, is known from, for example, DE 2,319,230, DE 3,609,804, EP 25,136, DE 2,529,434, DE 2,122,663, JP-A 7,343,181, FR 2,143,942, DE 2,132,681, DE 1,769,436.

The disadvantage of the known processes is that the dyestuffs used have only a limited area of application, since fluorescent hues (see DE 2,319,230, DE 3,609,804; EP 25,136; DE 2,529,434; DE 2,122,663, JP-A 7,343,181) or yellow hues of low colour strength (see FR 2,143,942, DE 2,132,681, DE 1,769,436) are obtained.

The object of the invention is to provide an improved process for mass-coloration and new dyestuffs. It is true that German Auslegeschrift 2,844,606, 2,803,104 and U.S. Pat. No. 4,260,776 have already disclosed the use of benzopyranylidene dyestuffs for the dyeing and printing of fibre materials and as laser dyestuffs, but without reference to mass-coloration.

The present invention relates to a process for the masscoloration of plastics with a dyestuff, characterised in that the dyestuff has the following formula

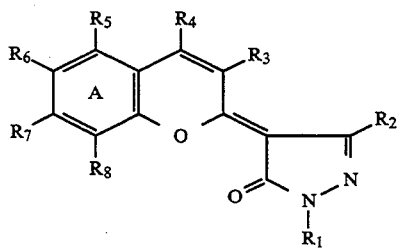

in which $R_1$ denotes unsubstituted or in particular alkoxy-, aryloxy-, hydroxyl-, acyloxy-, halogen-, cyano-, alkoxycarbonyl-, dialkylaminocarbonyl-, dialkylamino-substituted alkyl, unsubstituted or alkyl-, alkoxy-, aryloxy-, hydroxyl-, acyloxy-, halogen-, cyano-, alkoxycarbonyl-, dialkylaminocarbonyl-, alkylsulphonyl-, arylsulphonyl-, dialkylsulphamido-, dialkylamino-, aryl-substituted aralkyl, unsubstituted or alkyl-, aryl-, alkyloxy-, aryloxy-, hydroxyl-, halogen-, cyano-, nitro-, alkoxycarbonyl-, dialkylaminocarbonyl-, dialkylamino-,alkylsulphonyl-,arylsulphonyl- or sulphonamido(unsubstituted or alkyl- or aryl-mono- or -disubstituted)-substituted aryl or heterocyclyl such as pyridyl, pyrimidyl, quinolinyl, sulpholanyl, $R_2$ denotes unsubstituted or in particular alkoxy-, aryloxy-, hydroxyl-, acyloxy-, halogen-, cyano-, alkoxycarbonyl-, dialkylaminocarbonyl-, dialkylamino-substituted alkyl, unsubstituted or alkyl-, alkoxy-, aryloxy-, hydroxyl-, acyloxy-, halogen-, cyano-, alkoxycarbonyl-, dialkylaminocarbonyl-, alkylsulphonyl-, arylsulphonyl-, dialkylsulphamido-, dialkylamino-, aryl-substituted aralkyl, unsubstituted or alkyl-, aryl-, alkyloxy-, aryloxy-, hydroxyl-, halogen-, cyano-, nitro-, alkoxycarbonyl-, dialkylaminocarbonyl-, dialkylamino-, alkylsulphonyl-, arylsulphonyl- or dialkylsulphamido-substituted aryl or heterocyclyl such as pyridyl, pyrimidyl, quinolinyl, chlorine, bromine, alkoxycarbonyl, dialkylcarbamoyl, cyano, hydroxyl, alkoxy, acyloxy or a radical of the formula —$NZ_1Z_2$, in which $Z_1$ denotes hydrogen, alkyl, aralkyl, aryl, cycloalkyl or a heterocyclic radical and $Z_2$ denotes an acyl radical or $Z_1$ and $Z_2$ together with the joint N atom form the radical

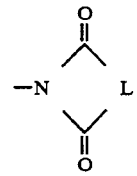

L is 1,2-phenylene, 1,2-, 2,3- or 1,8-naphthylene, 1,2-cyclohex-1-enylene, ethylene or vinylene, $R_3$ denotes hydrogen, alkyl, aryl, halogen, hydroxyl, alkoxy, cyano, alkoxycarbonyl, formyl, dialkylcarbamoyl, alkylsulphonyl, arylsulphonyl, dialkylaminosulphonyl, $R_4$ denotes hydrogen, alkyl, aryl, hydroxyl, alkoxy, halogen, cyano, alkoxycarbamoyl, alkylsulphonyl, arylsulphonyl, $R_5$ to $R_8$, identical or different, denote hydrogen, alkyl, aryl, heterocyclyl, alkoxy, aryloxy, hydroxyl, amino, mono- or disubstituted amino, such as, for example, alkylamino, dialkylamino, alkylsulphonyl, arylsulphonyl, dialkylsulphonamido, halogen or together with an adjacent radical denote a fused-on aromatic or heterocyclic ring.

Mass-coloration is understood here to mean in particular processes in which the dyestuff is incorporated in the melted plastic composition, for example with the aid of an extruder, or in which the dyestuff is already added to starting components for production of the plastic, for example to monomers before polymerisation.

In a preferred embodiment, the substituents $R_3$ to $R_8$ denote hydrogen.

In a further preferred embodiment, $R_5$ and $R_6$ together denote the radical of an aromatic or heterocyclic ring fused onto ring A, in particular a benzene ring.

In a particularly preferred embodiment, $R_7$ denotes alkoxy, in particular $C_1$–$C_4$-alkoxy, and especially $NR_{10}R_{11}$, in which $R_{10}$ and $R_{11}$ denote hydrogen, alkyl, aryl, aralkyl each of which is unsubstituted or substituted by alkoxy, aryloxy, acyloxy, cyano, hydroxyl, dialkylamino, halogen, or together with the joint N atom denote a heterocyclic radical, in particular a triazole radical, or a ring bond to ring A.

$R_2$ denotes $C_1$–$C_4$-alkyl, in particular methyl and tert.-butyl, phenyl, $R_1$ denotes phenyl, naphthyl, it being possible for the substituents to be substituted in turn by methyl, alkylsulphonyl, arylsulphonyl, dialkylsulphamido and halogen, in particular chlorine, or sulpholanyl.

Very particular preference is given to those compounds in which $R_{10}$, $R_{11}$, identical or different, denote $C_1$–$C_4$-alkyl or together with the nitrogen atom denote a 5- or 6-membered heterocycle, in particular a triazole.

Some of the dyestuffs to be used according to the invention are known, for example German Ausleges-chrift 2,844,606, U.S. Pat. No. 4,260,776 and German Auslegeschrift 2,803,104.

Furthermore, the invention relates to new compounds of the formula (II)

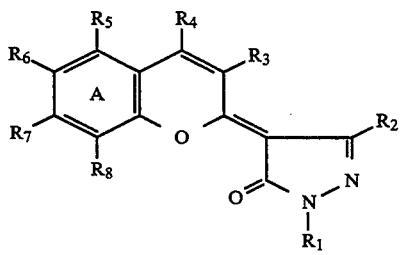

in which
R$_1$ denotes alkyl, aralkyl, aryl or heterocyclyl, it being possible for these radicals to be substituted or unsubstituted,
R$_2$ denotes alkyl, aralkyl, aryl, heterocyclyl, alkoxy-carbonyl, dialkylcarbamoyl, alkoxyacyloxy, it being possible for these radicals to be substituted or unsubstituted, or denotes a radical of the formula —NZ$_1$Z$_2$ or chlorine, bromine, cyano, hydroxyl,
Z$_1$ denotes hydrogen, alkyl, aralkyl, aryl, cycloalkyl or a heterocyclic radical and
Z$_2$ denotes an acyl radical or
Z$_1$ and Z$_2$ together with the joint N atom form the radical

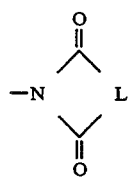

L is 1,2-phenylene, 1,2-, 2,3- or 1,8-naphthylene, 1,2-cyclohex-1-enylene, ethylene or vinylene,
R$_3$ denotes hydrogen, alkyl, aryl, halogen, hydroxyl, alkoxy, cyano, alkoxycarbonyl, formyl, dialkylcarbamoyl, alkylsulphonyl, arylsulphonyl, dialkylaminosulphonyl,
R$_4$ denotes hydrogen, alkyl, aryl, hydroxyl, alkoxy, halogen, cyano, alkoxycarbamoyl, alkylsulphonyl, arylsulphonyl,
R$_5$, R$_6$, R$_8$, identical or different, denote hydrogen, alkyl, aryl, heterocyclyl, alkoxy, aryloxy, hydroxyl, amino, alkylamino, dialkylamino, alkylsulphonyl, arylsulphonyl, dialkylsulphonamido, halogen, or together with an adjacent radical denote a fused-on aromatic or heterocyclic ring,
R$_7$ denotes hydrogen, alkyl, aryl, heterocyclyl, alkoxy, aryloxy, hydroxyl, halogen, arylsulphonyl, dialkylsulphamido or together with an adjacent radical denotes a fused-on aromatic or heterocyclic radical.

The compounds of the formula (II) can be prepared by the following steps by condensation of

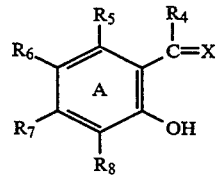

in which

R$_4$–R$_8$ have the meaning given in formula II,
X represents =O, =N—C$_6$H$_5$ or N$^\oplus$(CH$_3$)$_2$An$^\ominus$ and An$^\ominus$ represents an anion,
with

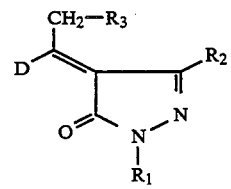

in which
R$_1$–R$_3$ have the meaning given and
D represents —O—W$^1$, —S—W$^1$, —N(W$^2$W$^3$) or halogen
W$^1$ represents hydrogen or C$_1$–C$_3$-alkyl and
W$^2$ and W$^3$ represent C$_1$–C$_4$-alkyl or together represent —(CH$_2$)$_4$—, —(CH$_2$)$_5$— or —(CH$_2$)$_2$—O—(CH$_2$)$_2$,
in an inert solvent at 60°–180° C., if appropriate with the addition of an acid or preferably alkaline catalyst (for example piperidine, pyrrolidine, morpholine) with elimination of XH$_2$ and DH.

Furthermore also by condensation of

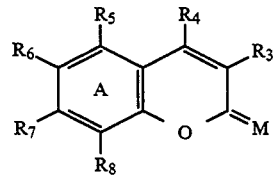

in which
R$_3$–R$_8$ have the meaning given in formula II and
M represents =S or =N-W and
W represents hydrogen, C$_1$–C$_4$-alkyl, benzyl, cyclohexyl, phenyl, toluyl, chlorophenyl, methoxyphenyl, C$_1$–C$_3$-alkylcarbonyl, C$_1$–C$_2$-alkoxycarbonyl or benzoyl,
with

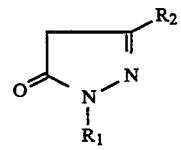

in which
R$_1$ and R$_2$ have the meaning given in formula II, in an inert solvent at 80°–200° C. with elimination of MH$_2$.

Instead of compound V, it is also possible to react

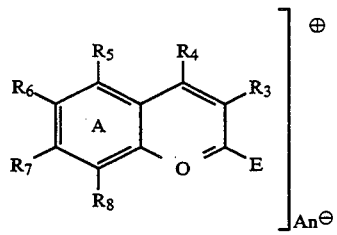

in which $R_3$–$R_8$ and $An^\ominus$ have the abovementioned meaning and E represents —S—alkyl or —O—alkyl, with compound VI in an analogous manner, preferably with the addition of an acid-binding agent.

Dyestuffs of the formulae (I) and (II) to be used according to the invention are the compounds listed in Tables 1–IV.

TABLE I

[Structure: chromene fused to pyrazolone with substituents $R_1$ on N and $R_2$ on C]

| $R_1$ | $R_2$ |
|---|---|
| phenyl | CH₃ |
| 4-CH₃-phenyl | CH₃ |
| 2-Cl-phenyl | CH₃ |
| 3-Cl-phenyl | CH₃ |
| 2,5-diCl-phenyl | CH₃ |
| 2,4,5-triCl-phenyl | CH₃ |
| 3-((CH₃)₂NO₂S)-phenyl | CH₃ |
| tetrahydrothiophene-SO₂ (3-yl) | CH₃ |
| phenyl | phenyl |

TABLE II

[Structure: naphtho-chromene fused to pyrazolone with substituents $R_1$ on N and $R_2$ on C]

| $R_1$ | $R_2$ |
|---|---|
| phenyl | CH₃ |
| 4-CH₃-phenyl | CH₃ |
| phenyl-O-phenyl (3-phenoxyphenyl) | CH₃ |
| β-naphthyl | CH₃ |
| 2-Cl-phenyl | CH₃ |
| 3-Cl-phenyl | CH₃ |
| 3,4-diCl-phenyl | CH₃ |
| 2,5-diCl-phenyl | CH₃ |
| 2,4,5-triCl-phenyl | CH₃ |
| 3-((CH₃)₂NO₂S)-phenyl | CH₃ |
| phenyl | C(CH₃)₃ |

TABLE II-continued
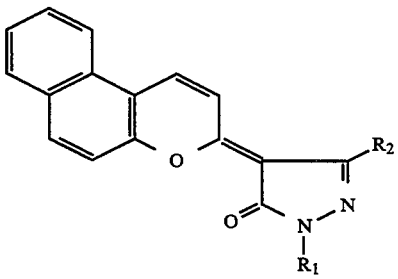
| R₁ | R₂ |
|---|---|
| phenyl | 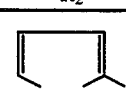 |
| phenyl | phenyl |
| CH₃ | CH₃ |
| 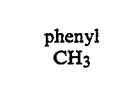 | CH₃ |
TABLE III
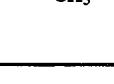
| R₁ | R₅ |
|---|---|
| phenyl | H |
|  | H |
| phenyl | OCH₃ |
| 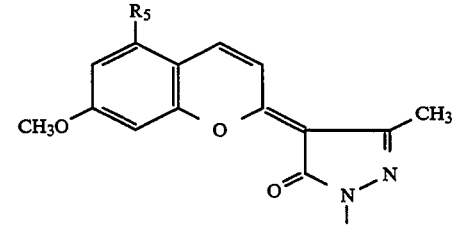 | OCH₃ |
TABLE IV
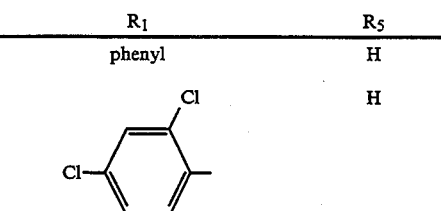
| R₁ | R₂ | R₁₀ | R₁₁ |
|---|---|---|---|
| phenyl | CH₃ | C₂H₅ | C₂H₅ |
| 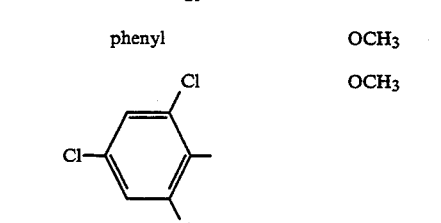 | CH₃ | ↓ | ↓ |
| 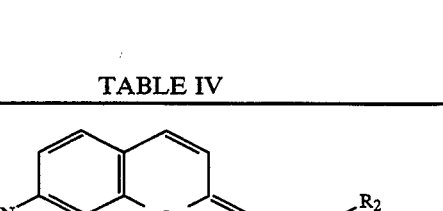 | CH₃ | ↓ | ↓ |
| 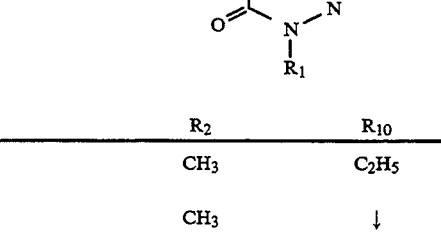 | CH₃ | ↓ | ↓ |
| β-naphthyl | CH₃ | ↓ | ↓ |

TABLE IV-continued
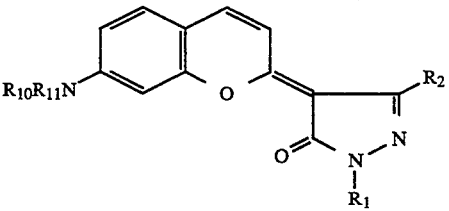
| R₁ | R₂ | R₁₀ | R₁₁ |
|---|---|---|---|
| 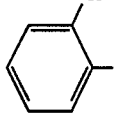 2-Cl-C₆H₄ | CH₃ | ↓ | ↓ |
| 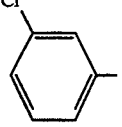 3-Cl-C₆H₄ | CH₃ | ↓ | ↓ |
| 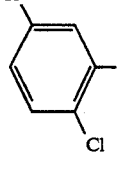 2,5-Cl₂-C₆H₃ | CH₃ | ↓ | ↓ |
| 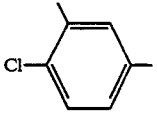 3,4-Cl₂-C₆H₃ | CH₃ | ↓ | ↓ |
| 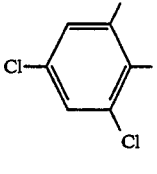 2,4,6-Cl₃-C₆H₂ | CH₃ | ↓ | ↓ |
| 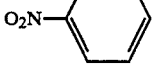 O₂N-C₆H₄- | CH₃ | ↓ | ↓ |
| (CH₃)₂NO₂S- 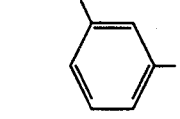 | CH₃ | C₂H₅ | C₂H₅ |
| 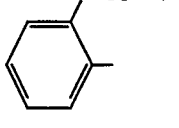 2-(SO₂ phenyl)-C₆H₄ | CH₃ | ↓ | ↓ |
| phenyl SO₂- 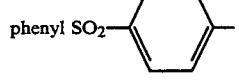 | CH₃ | ↓ | ↓ |
| CH₃ | CH₃ | ↓ | ↓ |

TABLE IV-continued

[Structure: chromene-pyrazolone dye with $R_{10}R_{11}N$- substituent on chromene, and $R_1$, $R_2$ on pyrazolone ring]

| $R_1$ | $R_2$ | $R_{10}$ | $R_{11}$ |
| --- | --- | --- | --- |
| tetrahydrothiophene-SO$_2$ (cyclic sulfone) | CH$_3$ | ↓ | ↓ |
| phenyl | t-Bu | ↓ | ↓ |
| phenyl | CF$_3$ | ↓ | ↓ |
| phenyl | phenyl | ↓ | ↓ |
| phenyl | o-tolyl (CH$_3$-phenyl) | ↓ | ↓ |
| phenyl | p-methoxyphenyl (CH$_3$O-phenyl) | ↓ | ↓ |
| 2,4,6-trichlorophenyl | phenyl | ↓ | ↓ |
| CH$_3$ | phenyl | ↓ | ↓ |
| o-chlorophenyl | —N(acetyl)(phenyl) | ↓ | ↓ |
| phenyl | —N(acetyl)(4-chlorophenyl) | ↓ | ↓ |
| phenyl | CH$_3$ | N=C(C$_2$H$_5$)–C(CH$_3$)=N (diimine) | |

The dyestuffs to be used according to the invention can readily be used for the mass-coloration of all plastics. Particularly preferred plastics are thermoplastics, for example vinyl polymers and polyesters.

Suitable vinyl polymers are polystyrene, styrene/acrylonitrile copolymers, styrene/butadiene copolymers, styrene/butadiene/acrylonitrile terpolymers, polymethacrylate, and the like.

Further suitable polyesters are: polyethylene terephthalates, polycarbonates and cellulose esters.

Preference is given to polystyrene, styrene blended polymers, polycarbonates and polymethacrylate. Particular preference is given to polystyrene.

The high-molecular-weight compounds mentioned can be present individually or in mixtures, as plastic compositions or melts.

The dyestuffs according to the invention are used in finely divided form, it being possible but not necessary to use dispersants.

If the dyestuffs (I) are used after polymerisation, they are mixed or milled with the plastic granules while dry, and this mixture is plasticised and homogenised, for example, in mixing rolls or in screws. However, the dyestuffs can also be added to the molten composition and this composition can be homogeneously distributed by stirring. The material precoloured in this manner is then further processed as usual, for example by spinning, to give bristles, filaments and the like, or by extrusion or injection moulding to give moulded articles.

Since the dyestuffs of the formula (I) are resistant to polymerisation catalysts, in particular peroxides, it is also possible to add the dyestuffs to the monomeric starting materials for the plastics and then carrying out the polymerisation in the presence of polymerisation catalysts. This makes it necessary to dissolve the dyestuffs in the monomeric components or to mix them intimately therewith.

The dyestuffs of the formula (I) are preferably used for the coloration of the polymers mentioned in amounts of 0.0001% to 1%, in particular 0.01% to 0.5%, relative to the amount of polymer.

The addition of pigments which are insoluble in the polymers, such as, for example, titanium dioxide, makes it possible to obtain analogous valuable colourings of high hiding power.

Titanium dioxide can preferably be used in an amount of 0.1% -2%, relative to the amount of polymer.

The process according to the invention gives transparent, brilliant orange to red dyeings having good heat resistance and good light and weather fastness. The dyestuffs are furthermore distinguished by high colour strength.

It is also possible to use mixtures of different dyestuffs of the formula (I) and/or mixtures of dyestuffs of the formula (I) with other dyestuffs and/or inorganic or organic pigments in the process according to the invention.

The invention is illustrated by, but is not restricted to, the examples which follow, in which the parts given are by weight.

EXAMPLE 1

100 parts of polystyrene granules and 0.02 part of a dyestuff of the formula

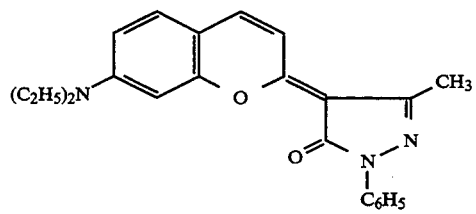

are thoroughly mixed in a drum mixer for 15 minutes. The dry-coloured granules are processed at 240° C. in a screw injection-moulding machine, giving transparent red sheets of very good light fastness. Instead of the polystyrene polymer, it is also possible to use blended polymers of butadiene and acrylonitrile. If, in addition, 0.5 part of titanium dioxide is added, dyeings of high colour strength and high hiding power are obtained.

EXAMPLE 2

0.015 part of the dyestuff from Example 1 and 100 parts of polymethyl methacrylate are mixed while dry and homogenised at 230° C. in a single-screw extruder. The material leaving the extruder in rope-form is granulated. It can then be moulded into shaped articles. A transparently red-coloured plastic having good light and wet fastness is obtained.

EXAMPLE 3

100 parts of a commercially available polycarbonate are mixed in the form of granules with 0.03 part of the dyestuff from Example 1 while dry. The granules thus sprayed are homogenised at 290° C. in a twin-screw extruder. A transparent red coloration having good light fastness is obtained. The coloured polycarbonate is extruded in rope-form and processed to give granules. The granules can be processed by the customary finishing methods of thermoplastic compositions.

If the procedure as described above is repeated, except that 1% of titanium dioxide is added, a red coloration of high hiding power is obtained.

EXAMPLE 4

0.04 part of the dyestuff from Example 1 is mixed while dry with 100 parts of styrene/acrylonitrile copolymer, and the mixture is homogenised at 190° C. in a twin-screw extruder, granulated and then moulded into shaped articles in the usual manner. A transparent red plastic having good light fastness is obtained.

EXAMPLE 5

0.025 part of the dyestuff from Example 1 is mixed with 100 parts of polyethylene terephthalate of the transparent type, and the mixture is homogenised at 280° C. in a twin-screw extruder. A transparent red coloration having good light fastness is obtained. After subsequent granulation, the coloured plastic can also be processed by the customary methods of thermoplastic moulding. If the example is repeated using 1% of titanium dioxide, a coloration of high hiding power is obtained.

EXAMPLE 6

0.05 part of tert.-dodecanethiol and 0.05 part of the dyestuff from Example 1 are dissolved in 98.9 parts of styrene. This solution is dispersed in a solution of 200 parts of deionised water, 0.3 part of partially hydrolysed polyvinyl acetate (for example Moviol 50/88 from Hoechst) and 0.05 part of dodecylbenzenesulphonate. After addition of 0.1 part of dibenzoyl peroxide in 1 part of styrene, the dispersion is heated to 80° C. with vigorous stirring, and polymerisation is started. Use of the following polymerisation conditions:

4 h at 80° C., 2 h at 90° C., 3 h at 110° C., 2 h at 130° C. gives the polymer in a yield of 98% of theory. The polymer is obtained in the form of beads which, depending on the stirring conditions, have a diameter of 0.1–1.5 mm ($d_{50}$ value). The polymer is separated from the serum by filtration, dried at 110° C. to a residual moisture content of 0.5%. It is melted in a mixer (hot rolls), 0.5% of zinc stearate and 0.2% of Ionol are admixed and the polymer is granulated.

The polymer can be processed by the customary methods of thermoplastic moulding, for example by injection moulding, to give red, transparent moulded articles.

EXAMPLE 7

0.2 part of tert.-dodecanethiol and 0.01 part of the dyestuff from Example 1 are dissolved in 74.8 parts of styrene, and the solution is then dispersed in a solution of 200 parts of fully deionised water and 0.2 part of a styrene/maleic anhydride copolymer neutralised with sodium hydroxide. After addition of 0.1 part of dibenzoyl peroxide dissolved in one part of styrene, the dispersion is heated to 80° C. with vigorous stirring, and polymerisation is started. After polymerisation as in Example 1, work-up is carried out in the same manner as described there. 0.5% of zinc stearate as a lubricant and 0.5% of Ionol as an anti-ageing agent are incorporated on the hot roll. The granulated polymer can be injection moulded to give transparent red articles.

EXAMPLE 8

A solution of 99.95 parts of styrene, 0.04 part of the dyestuff from Example 1 and 0.01 part of di-tert.-butyl peroxide are introduced into a continuous primary reactor operated in the flooded mode, and polymerisation is started at a temperature of 75° C. The partially polymerised solution (polystyrene content 20%) leaving the primary reactor is introduced into a twin-screw extruder. The two screws run in the opposite direction at 20 rpm. The four heatable or coolable segments of the screw extruder are maintained in the order product inlet product outlet at 110° C., 130° C., 160° C., 180° C. The polymer leaves the screw extruder at a solids concentration of 80%. In a downstream extruder, 3 parts by weight of Ionol and 5 parts by weight of octyl alcohol are metered in per 1000 parts by weight of polymer solution, the polymer is degassed and then granulated. The red granules can be processed to give moulded articles.

EXAMPLE 9

0.02 part of the dyestuff from Example 1 is dissolved in 74.97 parts of styrene and 25 parts of acrylonitrile or methacrylonitrile. After addition of 0.01 part of ditert.-butyl peroxide, the solution thus obtained is fed into a continuous primary reactor operated in the flooded mode. Polymerisation and work-up are carried out as described in Example 3. The transparent, red granules can be further processed by the customary methods of processing thermoplastic materials to give profiles and sheets.

EXAMPLE 10

0.03 part of the dyestuff from Example 1 is dissolved in 99.97 parts of methyl methacrylate. After addition of 0.1 part of dibenzoyl peroxide, the solution is heated to 120° C., and polymerisation is started. After 30 minutes, polymerisation of the partially polymerised methyl methacrylate is completed at 80° C. between two glass sheets within ten hours. Red, transparent polymethyl methacrylate sheets are obtained.

EXAMPLE 11

100 parts of nylon-6 chips, obtained by polymerisation of ε-caprolactam, are intimately mixed with 0.05 part of the dyestuff from Example 1 in a shaker. The powder-coated chips thus obtained are melted at 260° C. in an extruder, the melt obtained is extruded through a single-hole die of diameter 0.5 mm, and the exiting filament is taken off at a rate of about 25 m/min. The filament can be stretched in hot water to four times its length. A transparently red-coloured filament having excellent light fastness is obtained. If it is desired to obtain a colouring of high hiding power, 0.5 part of titanium dioxide is added.

The residence time in the extruder can be up to 30 minutes without impairment of the hue.

EXAMPLE 12

The procedure as described in Example 1 is repeated, using the dyestuffs listed in Tables V–IX, giving the hues listed there.

TABLE V

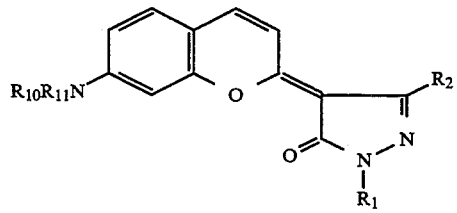

| Example | $R_1$ | $R_2$ | $R_{10}$ | $R_{11}$ | Hue |
|---|---|---|---|---|---|
| 12 | CH₃—⟨phenyl⟩— | CH$_3$ | C$_2$H$_5$ | C$_2$H$_5$ | red |
| 13 | 2-CH₃, 6-C₂H₅-phenyl | CH$_3$ | ↓ | ↓ | red |
| 14 | phenyl-O—⟨phenyl⟩— | CH$_3$ | ↓ | ↓ | red |
| 15 | β-naphthyl | CH$_3$ | ↓ | ↓ | red |

TABLE V-continued

| Example | R₁ | R₂ | R₁₀ | R₁₁ | Hue |
|---|---|---|---|---|---|
| 16 | 2-Cl-phenyl | CH₃ | ↓ | ↓ | red |
| 17 | 3-Cl-phenyl | CH₃ | ↓ | ↓ | red |
| 18 | 2,5-diCl-phenyl | CH₃ | ↓ | ↓ | red |
| 19 | 3,4-diCl-phenyl | CH₃ | ↓ | ↓ | red |
| 20 | 2,4,5-triCl-phenyl | CH₃ | ↓ | ↓ | red |
| 21 | 2-O₂N-phenyl | CH₃ | ↓ | ↓ | red |
| 22 | 3-(CH₃)₂NO₂S-phenyl | CH₃ | C₂H₅ | C₂H₅ | red |
| 23 | 2-(SO₂phenyl)-phenyl | CH₃ | ↓ | ↓ | red |
| 24 | 4-(phenyl SO₂)-phenyl | CH₃ | ↓ | ↓ | red |
| 25 | CH₃ | CH₃ | ↓ | ↓ | red-brown |

TABLE V-continued

[Structure: chromene with R₁₀R₁₁N substituent, linked to pyrazolone bearing R₁ on N and R₂ substituent]

| Example | R₁ | R₂ | R₁₀ | R₁₁ | Hue |
|---------|-----|-----|-----|-----|-----|
| 26 | tetrahydrothiophene-SO₂ | CH₃ | ↓ | ↓ | red |
| 27 | phenyl | t-butyl | ↓ | ↓ | red |
| 28 | phenyl | CF₃ | ↓ | ↓ | bluish red |
| 29 | phenyl | phenyl | ↓ | ↓ | bluish red |
| 30 | phenyl | o-tolyl (CH₃) | ↓ | ↓ | bluish red |
| 31 | phenyl | MeO-phenyl | ↓ | ↓ | bluish red |
| 32 | 2,4,6-trichlorophenyl | phenyl | ↓ | ↓ | bluish red |
| 33 | CH₃ | phenyl | ↓ | ↓ | reddish bordeaux |
| 34 | o-chlorophenyl | —N(phenyl)(CO—CH₃) | ↓ | ↓ | bluish red |
| 35 | phenyl | —N(4-chlorophenyl)(CO—CH₃) | ↓ | ↓ | bluish red |
| 36 | phenyl | CH₃ | =N—C(C₂H₅)=C(CH₃)—N= | | brown |

TABLE VI

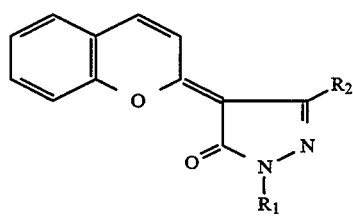

| Example | R₁ | R₂ | Hue |
|---|---|---|---|
| 37 | phenyl | $CH_3$ | orange |
| 38 | 4-methylphenyl (CH₃–C₆H₄–) | $CH_3$ | yellow-brown |
| 39 | 2-chlorophenyl | $CH_3$ | orange |
| 40 | 3-chlorophenyl | $CH_3$ | orange |
| 41 | 2,5-dichlorophenyl | $CH_3$ | orange |
| 42 | 2,4,6-trichlorophenyl | $CH_3$ | orange |
| 43 | 3-(N,N-dimethylsulfamoyl)phenyl ((CH₃)₂NO₂S–C₆H₄–) | $CH_3$ | orange |
| 44 | $CH_3$ | $CH_3$ | orange |
| 45 | tetrahydrothiophene-3-yl 1,1-dioxide | $CH_3$ | orange |
| 46 | phenyl | phenyl | orange |

TABLE VII

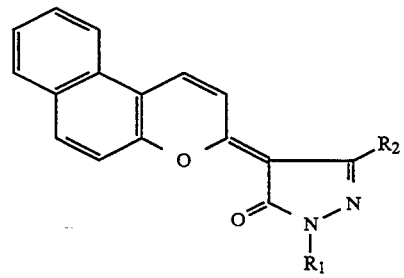

| Example | R₁ | R₂ | Hue |
|---|---|---|---|
| 47 | phenyl | $CH_3$ | brown |
| 48 | 4-methylphenyl (CH₃–C₆H₄–) | $CH_3$ | brown |
| 49 | phenyl-O– (phenoxyphenyl) | $CH_3$ | brown |
| 50 | β-naphthyl | $CH_3$ | brown |
| 51 | 2-chlorophenyl | $CH_3$ | red-brown |
| 52 | 3-chlorophenyl | $CH_3$ | brown |
| 53 | 2,3-dichlorophenyl | $CH_3$ | red-brown |
| 54 | 2,5-dichlorophenyl | $CH_3$ | red-brown |
| 55 | 2,4,6-trichlorophenyl | $CH_3$ | red-brown |
| 56 | 3-(N,N-dimethylsulfamoyl)phenyl ((CH₃)₂NO₂S–C₆H₄–) | $CH_3$ | red-brown |
| 57 | phenyl | t-butyl | brown |

TABLE VII-continued

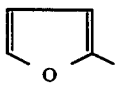

| Example | R₁ | R₂ | Hue |
|---|---|---|---|
| 58 | phenyl | 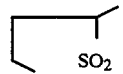 | red-brown |
| 59 | phenyl | phenyl | brown |
| 60 | CH₃ | CH₃ | violet-brown |
| 61 | (butyl-SO₂-) | CH₃ | orange |

TABLE VIII

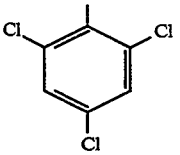

| Example | R₁ | R₂ | Hue |
|---|---|---|---|
| 62 | phenyl | CH₃ | orange |
| 63 | (2,4,6-trichlorophenyl) | CH₃ | orange |

TABLE IX

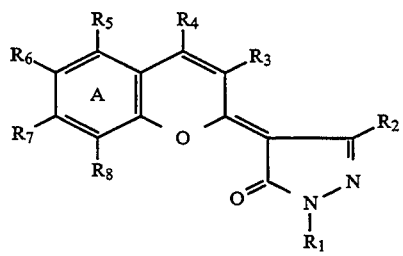

| Example | R₁ | R₂ | Hue |
|---|---|---|---|
| 64 | phenyl | CH₃ | orange |

TABLE IX-continued

| | | | |
|---|---|---|---|
| 65 | 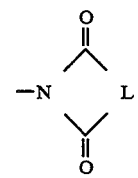 | CH₃ | orange |

We claim:

1. Process for the mass-coloration of plastics comprising incorporating a dyestuff a) in the starting materials for production of the plastic, or b) in the melted plastic composition, characterised in that the dyestuff has the following formula

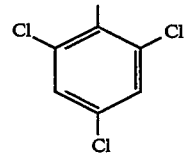

in which $R_1$ denotes alkyl, aralkyl, aryl or heterocyclyl, it being possible for these radicals to be substituted or unsubstituted, $R_2$ denotes alkyl, aralkyl, aryl, heterocyclyl, alkoxycarbonyl, dialkylcarbamoyl, alkoxyacyloxy, or a radical of the formula $-NZ_1Z_2$, it being possible for these radicals to be substituted or unsubstituted, or denotes chlorine, bromine, cyano, hydroxyl, $Z_1$ denotes hydrogen, alkyl, aralkyl, aryl, cycloalkyl or a heterocyclic radical and $Z_2$ denotes an acyl radical or $Z_1$ and $Z_2$ together with the joint N atom form the radical $$-N\diagdown \!\!\!\! \begin{array}{c} C=O \\ \\ C=O \end{array} \!\!\!\! \diagup L$$

L is 1,2-phenylene, 1,2-, 2,3- or 1,8-naphthylene, 1,2-cyclohex-1-enylene, ethylene or vinylene, $R_3$ denotes hydrogen, alkyl, aryl, halogen, hydroxyl, alkoxy, cyano, alkoxycarbonyl, formyl, dialkylcarbamoyl, alkylsulphonyl, arylsulphonyl, dialkylaminosulphonyl, $R_4$ denotes hydrogen, alkyl, aryl, hydroxyl, alkoxy, halogen, cyano, alkoxycarbamoyl, alkylsulphonyl, arylsulphonyl, $R_5$ to $R_8$, identical or different, denote hydrogen, alkyl, aryl, heterocyclyl, alkoxy, aryloxy, hydroxyl, amino, mono- or disubstituted amino, such as, for example, alkylamino, dialkylamino, alkylsulphonyl, arylsulphonyl, dialkylsulphonamido, halogen, or together with an adjacent radical denote a fused-on aromatic or heterocyclic ring.

2. Process according to claim 1, characterised in that $R_3$ to $R_8$ denote hydrogen.

3. Process according to claim 1, characterised in that $R_5$ and $R_6$ together denote the radical of an aromatic or heterocyclic ring fused onto ring A.

4. Process according to claim 1, characterised in that $R_7$ denotes alkoxy, oxy, or $NR_{10}R_{11}$, in which
$R_{10}$ and $R_{11}$ denote hydrogen, alkyl, aryl, aralkyl, each of which is unsubstituted or substituted by alkoxy, aryloxy, acyloxy, cyano, hydroxyl, dialkylamino, halogen, or together with the joint N atom denote a heterocyclic radical, or a ring bond to ring A.

5. Process according to claim 1, characterised in that
$R^1$ denotes phenyl, naphthyl, it being possible for the substituents in turn to be substituted,
$R^2$ denotes $C_1$–$C_4$-alkyl, phenyl.

6. Process according to claim 4, characterised in that $R_{10}$, $R_{11}$, identical or different, denote $C_1$–$C_4$-alkyl or together with the joint N atom denote the radical of a 5- or 6-membered heterocycle.

7. Process according to claim 1, characterised in that at least one of the following dyestuffs is used:

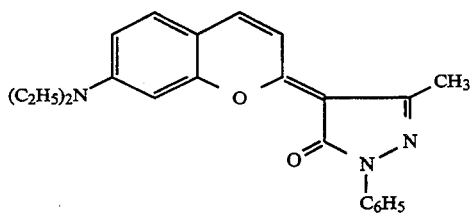

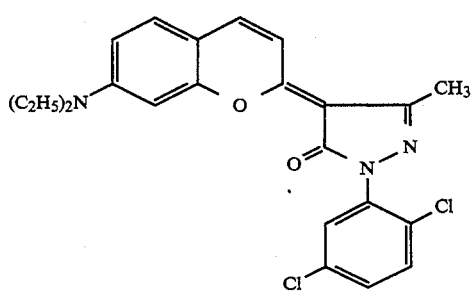

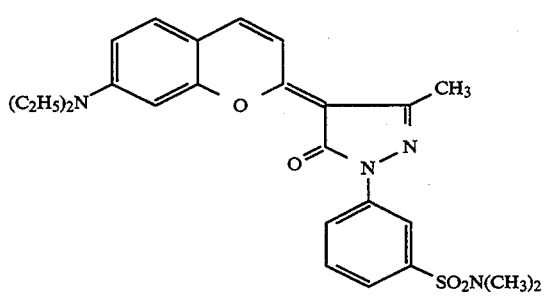

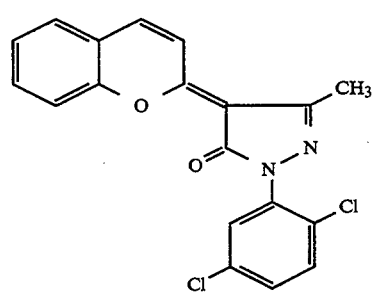

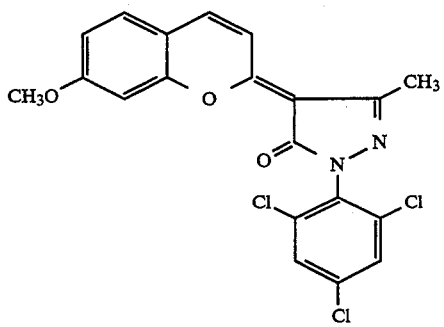

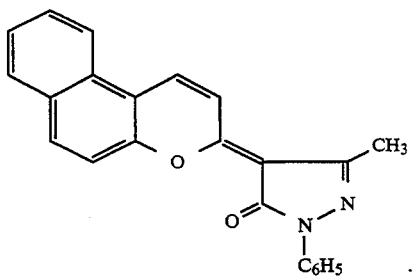

8. Process according to claim 1, characterised in that the plastic is a thermoplastic.

9. Process according to claim 1, characterised in that the plastic to be coloured is a vinyl polymer or a polyester.

10. A dyestuff of the formula (II)

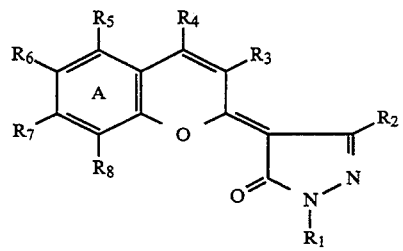

in which
$R_1$ denotes alkyl, aralkyl, aryl or heterocyclyl, it being possible for these radicals to be substituted or unsubstituted,
$R_2$ denotes alkyl, aralkyl, aryl, heterocyclyl, alkoxycarbonyl, dialkylcarbamoyl, alkoxyacyloxy, or a radical of the formula —$NZ_1Z_2$, it being possible for these radicals to be substituted or unsubstituted, or denotes chlorine, bromine, cyano, hydroxyl,
$Z_1$ denotes hydrogen, alkyl, aralkyl, aryl, cycloalkyl or a heterocyclic radical and
$Z_2$ denotes an acyl radical or
$Z_1$ and $Z_2$ together with the joint N atom form the radical

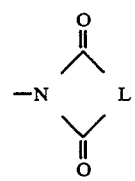

L is 1,2-phenylene, 1,2-, 2,3- or 1,8-naphthylene, 1,2-cyclohex- 1-enylene, ethylene or vinylene, $R_3$ denotes hydrogen, alkyl, aryl, halogen, hydroxyl, alkoxy, cyano, alkoxycarbonyl, formyl, dialkylcarbamoyl, alkylsulphonyl, arylsulphonyl, dialkylaminosulphonyl, $R_4$ denotes hydrogen, alkyl, aryl, hydroxyl, alkoxy, halogen, cyano, alkoxycarbamoyl, alkylsulphonyl, arylsulphonyl, $R_5$, $R_6$, $R_8$, identical or different, denote hydrogen, alkyl, aryl, heterocyclyl, alkoxy, aryloxy, hydroxyl, amino, alkylamino, dialkylamino, halogen, alkylsulphonyl, arylsulphonyl, dialkylsulphonamido, or together with an adjacent radical denote a fused-on aromatic or heterocyclic ring, $R_7$ denotes hydrogen, alkyl, aryl, heterocyclyl, alkoxy, aryloxy, hydroxyl, halogen, alkylsulphonyl, arylsulphonyl, dialkylsulphamido or together with an adjacent radical denotes a fused-on aromatic or heterocyclic ring.

11. Non-fibrous coloured plastic compositions, characterised in that they have been coloured using a dyestuff of the following formula

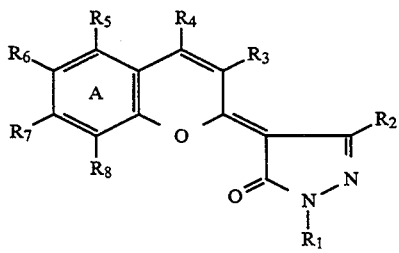

in which $R_1$ denotes alkyl, aralkyl, aryl or heterocyclyl, it being possible for these radicals to be substituted or unsubstituted, $R_2$ denotes alkyl, aralkyl, aryl, heterocyclyl, alkoxycarbonyl, dialkylcarbamoyl, alkoxyacyloxy, or a radical of the formula $-NZ_1Z_2$, it being possible for these radicals to be substituted or unsubstituted, or denotes chlorine, bromine, cyano, hydroxyl, $Z_1$ denotes hydrogen, alkyl, aralkyl, aryl, cycloalkyl or a heterocyclic radical and $Z_2$ denotes an acyl radical or $Z_1$ and $Z_2$ together with the joint N atom form the radical

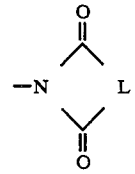

L is 1,2-phenylene, 1,2-, 2,3- or 1,8-naphthylene, 1,2-cyclohex- 1-enylene, ethylene or vinylene, $R_3$ denotes hydrogen, alkyl, aryl, halogen, hydroxyl, alkoxy, cyano, alkoxycarbonyl, formyl, dialkylcarbamoyl, alkylsulphonyl, arylsulphonyl, dialkylaminosulphonyl, $R_4$ denotes hydrogen, alkyl, aryl, hydroxyl, alkoxy, halogen, cyano, alkoxycarbamoyl, alkylsulphonyl, arylsulphonyl, $R_5$ to $R_8$, identical or different, denote hydrogen, alkyl, aryl, heterocyclyl, alkoxy, aryloxy, hydroxyl, amino, mono- or disubstituted amino, such as, for example, alkylamino, dialkylamino, alkylsulphonyl, arylsulphonyl, dialkylsulphonamido, halogen, or together with an adjacent radical denote a fused-on aromatic or heterocyclic ring.

* * * * *